United States Patent [19]
Carlsson et al.

[11] Patent Number: 5,924,033
[45] Date of Patent: Jul. 13, 1999

[54] COMMUNICATION CONTROL CIRCUITRY AND METHOD FOR A GROUP OF COMMONLY-MOVING MOBILE TRANSCEIVER UNITS

[75] Inventors: Göran Carlsson, Stenhamra; Marie Lambertsson, Solna, both of Sweden

[73] Assignee: Telefonaktiebolaget L/M Ericsson (publ), Stockholm, Sweden

[21] Appl. No.: 08/642,583

[22] Filed: May 3, 1996

[51] Int. Cl.$^6$ ........................................... H04Q 7/00
[52] U.S. Cl. ........................ 455/436; 455/11.1; 455/561
[58] Field of Search ..................... 455/422, 431–432, 455/436, 439, 11.1, 500, 517, 524, 550, 557, 561, 575; 370/310, 315, 331, 332

[56] References Cited

U.S. PATENT DOCUMENTS

| | | |
|---|---|---|
| 3,750,020 | 7/1973 | Baba et al. . |
| 3,896,380 | 7/1975 | Martin . |
| 3,979,673 | 9/1976 | Martin . |
| 3,979,674 | 9/1976 | Martin . |
| 4,012,662 | 3/1977 | Martin . |
| 4,280,225 | 7/1981 | Willis . |
| 4,677,687 | 6/1987 | Matsuo ...................................... 455/10 |
| 4,718,108 | 1/1988 | Davidson et al. ......................... 455/17 |
| 4,972,505 | 11/1990 | Isberg . |
| 5,187,803 | 2/1993 | Sohner et al. ............................ 455/4.1 |
| 5,384,824 | 1/1995 | Alvesalo . |
| 5,404,570 | 4/1995 | Charas et al. . |
| 5,519,761 | 5/1996 | Gilhousen ................................ 455/436 |
| 5,729,826 | 3/1998 | Gavrilovich ............................. 455/436 |

FOREIGN PATENT DOCUMENTS

| | | |
|---|---|---|
| 2289191 | 11/1995 | United Kingdom . |
| WO 94/08406 | 4/1994 | WIPO . |
| WO 96/02094 | 1/1996 | WIPO . |

OTHER PUBLICATIONS

M. Uhlirz, Concept of a GSM–Based Communication System For High Speed Trains; Proceedings of the Vehicular Technology Conference, Stockholm, Jun. 8–10, 1994, vol. 2, Jun. 8, 1994, Institute of Electrical and Electronics Engineers, pp. 1130–1134.

S.S. Rappaport, Blocking, Hand–Off and Traffic Performance for Cellular Communication Systems with Mixed Platforms, IEEE Proceedings I. Solid–State & Electron Devices, vol. 140, No. 5, Part I, Oct. 1, 1993, pp. 389–401.

*Primary Examiner*—Doris H. To
*Attorney, Agent, or Firm*—Jenkens & Gilchrist, P.C.

[57] ABSTRACT

Control circuitry and an associated method for a modified-user, wireless communications system, such as a cellular communication system were in groups of mobile transceiver units are positioned to travel together. Circuitry is positioned to travel together with the group of mobile transceiver units and to generate common control requests to control operation of the entire group of mobile transceiver units. When embodied in a cellular communication system, a common hand-off request is generated for the entire group of mobile transceiver units, auguating the need for each transceiver unit to independently generate a hand-off request.

17 Claims, 3 Drawing Sheets

COMMUNICATION CONTROL CIRCUITRY AND METHOD FOR A GROUP OF COMMONLY-MOVING MOBILE TRANSCEIVER UNITS

TECHNICAL FIELD OF THE INVENTION

The present invention relates generally to wireless, multi-user communication systems, such as a cellular communication system, having mobile transceiver units and a network infrastructure. More particularly, the present invention relates to circuitry, and an associated method, for facilitating communication between a group of mobile transceiver units positioned to move together, such as on a train or bus, and the network infrastructure.

Common control requests can be made for an entire group of the mobile transceiver units when the transceiver units are positioned to move together as a group. Loading problems which might otherwise occur if the transceiver units concurrently make independent control requests are avoided. In a cellular communication system, for instance, a plurality of users concurrently operating cellular phones on a mass transit device, such as a train or a bus, might overload the cellular system if independent control requests are concurrently made. Circuitry positioned to move together with the mass transit device makes control requests common to all of the cellular phones, avoids overloading of the cellular system.

BACKGROUND OF THE INVENTION

Utilization of multi-user, wireless communication systems to communicate telephonically has achieved wide popularity in recent years. Because a wireline connection is not required to effectuate telephonic communication, communication by way of a wireless communication system is possible at a location to which formation of a wireline connection would be impractical or impossible.

Cellular communication systems having networks are exemplary of multi-user, wireless communication systems. Cellular communication networks, for instance, have been installed throughout significant portions of the world. Large numbers of subscribers to such cellular networks are able to communicate telephonically when positioned in areas encompassed by such cellular networks. Telephonic communication of both voice and data are permitted in such networks.

In a cellular communication system, fixed-site transceivers, referred to as base stations, are installed throughout a geographic region. Mobile transceivers, i.e., "cellular phones" or "subscriber units", positioned anywhere throughout the geographic area at which the base stations are installed, can communicate with at least one of the base stations. As a mobile transceiver travels through the geographic area, communication by the mobile unit is transferred, or "handed-off", to successive ones of the base stations. Continued communication by way of the mobile unit, without apparent interruption to the user, is possible as the communication is handed-off between the successive ones of the base stations.

In some conventional, cellular systems, hand-offs are first initiated by a subscriber unit. The subscriber unit detects control signals generated upon selected control channels by the base stations. Comparisons are made at the subscriber unit between control signals received from various base stations. If communication between the subscriber unit and the cellular network by way of a first of the base stations is ongoing and the subscriber unit determines that communications can be better effectuated with the network by way of a another one of the base stations, the subscriber unit transmits a request that the ongoing communication be handed-off to the other base station.

Control circuitry, such as a mobile switching center, of the infrastructure of the cellular network typically controls the times in which a hand-off between two base stations is permitted. Responsive to the request transmitted by the subscriber unit, the control circuitry of the cellular network approves the hand-off, if such hand-off is possible.

If the hand-off request is approved, channels at the other base station are allocated for communication with the subscriber unit, and instructions are sent to the subscriber unit instructing the subscriber unit to be re-tuned to the allocated channels. Communications by the subscriber unit thereafter continue with the cellular network by way of the succeeding base station. In such manner, ongoing communication is permitted without apparent interruption to the user of the subscriber unit.

Improvements in communication technologies have increased the convenience and affordability of usage of a cellular communication system. A concomitant increased number of users of the cellular communication systems increasingly utilize cellular communication systems to communicate therethrough. Other wireless communication systems have similarly exhibited increased usage. And usage of still other types of wireless communication systems is anticipated in the future.

Users, for instance, make use of cellular systems when positioned in motor vehicles. As many subscriber units are of sizes and weights permitting their carriage by a user, the subscriber units can be carried by a user and communication can be effectuated at any time. For instance, the user can communicate by way of the cellular system when positioned on a mass transit device.

When only a single user, or only a very small number of users, communicate pursuant to the cellular system while positioned on the mass transit vehicle, the additional loading to the cellular system is not significant. That is to say, when only a single or small number of users communicate by way of the cellular system when traveling together on the mass transit vehicle, only a single, or small number of, concurrent hand-off requests are made to the cellular network infrastructure as the mass transit vehicle upon which the user is situated travels through a geographic area.

However, when significant numbers of users positioned upon the mass transit vehicle utilize the cellular system, loading problems sometimes occur. Such loading problems can occur because the users situated on the mass transit vehicle are all positioned closely to one another to travel, together with travel of the mass transit vehicle, in the same direction, at the same speed, and at the same time.

Although each cellular phone is independently operable, all of the cellular phones receives the same, or similar, control signals from the base stations. And, even though each of the cellular phones is independently operable to determine when a hand-off request is made, because of the common positioning and movement of the cellular phones, each of the cellular phones substantially-concurrently make hand-off requests to the cellular system network. Such concurrent requests can result in loading problems which might result in, e.g., inadvertent communication terminations.

A manner by which to reduce loading problems resulting when a plurality of users positioned to travel together at similar velocities during similar time periods would therefore be advantageous.

It is in light of this background information related to multi-user communication systems, such as a cellular communication system, that the significant improvements of the present invention have evolved.

SUMMARY OF THE INVENTION

The present invention advantageously provides a manner by which to avoid loading problems in a multi-user communication system resulting when a plurality of mobile transceiver units are positioned together to travel at substantially similar velocities during substantially similar time periods. By avoiding such loading problems, undesired communication interruption or termination of on-going communications is less likely to occur.

Common control requests can be made for an entire group of the mobile transceiver units when the mobile transceiver units are positioned to move together as a group. Such common control requests are made in place of independent control requests generated by each of the mobile transceiver units. The number of control requests can be significantly reduced, and loading problems which might otherwise occur if the transceiver units concurrently make independent control requests are avoided.

In one embodiment, the present invention is operative in conjunction with a cellular communication system. A plurality of users, positioned to travel together, e.g., on a mass-transit device can concurrently communicate using mobile subscriber units by way of the cellular system without causing loading problems to the network infrastructure of the cellular system. When, e.g., the mass-transit device passes between cells defined by the network infrastructure, a hand-off request requesting hand-off of the mobile subscriber units being used by the users is generated. Responsive to the hand-off request common to all of the subscriber units, hand-offs of all of the subscriber units is effectuated. Generation of independent hand-off requests by each of the subscriber units is not required, and the loading problems associated with large numbers of subscriber units concurrently requesting hand-offs is avoided.

A control element, such as a mobile switching center, of the cellular network receives the indications of the common control request and, responsive thereto, causes the generation and transmission of signals to retune the cellular phones to effectuate the hand-off the another base station.

When the mass-transit vehicle is formed of a train or other vehicle which travels along a standard, or otherwise set, path, the base stations to which the on-going communications should be handed-off may be quite simply determined. Because the vehicle travels along a standard path, once the direction of the vehicle is determined, successive ones of the base stations to which on-going communications should be handed-off can be readily ascertained. Particular ones of the base stations positioned in proximity to successive portions of the standard path to be taken by the mass-transit vehicle are known. Processing required of the control element of the cellular network can be further reduced as selection of successive ones of the base stations to which the on-going communications are handed-off, need not be determined, but rather, are predeterminable.

In these and other aspects, therefore, communications circuitry, and an associated method, controls communications between a group of mobile transceiver units and a wireless communication network infrastructure. The infrastructure has at least a first fixed-site transceiver unit and a second fixed-site transceiver unit. Each of the subscriber units is positioned to move together at substantially similar velocities during substantially similar time periods. A receiver is positioned to move together with the group of mobile transceiver units. The receiver is tunable to receive infrastructure-generated control signals transmitted by the at least first and second fixed-site transceiver units. A determiner is coupled to receive indications of the infrastructure-generated control signals received by the receiver. The determiner determines between which of the at least first and second fixed-site transceiver units communications with the group of transceiver units are best able to be effectuated. Fixed-site allocation request signals are generated responsive thereto. A transmitter is positioned to move together with the group of mobile transceiver units and is coupled to receive the fixed-site allocation request signals generated by the determiner. The transmitter transmits the fixed-site allocation request signals to the wireless communication network infrastructure to request allocation of a particular one of the at least first and second fixed-site transceivers to which to effectuate the communications between the group of mobile transceiver units and the wireless communication network infrastructure.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
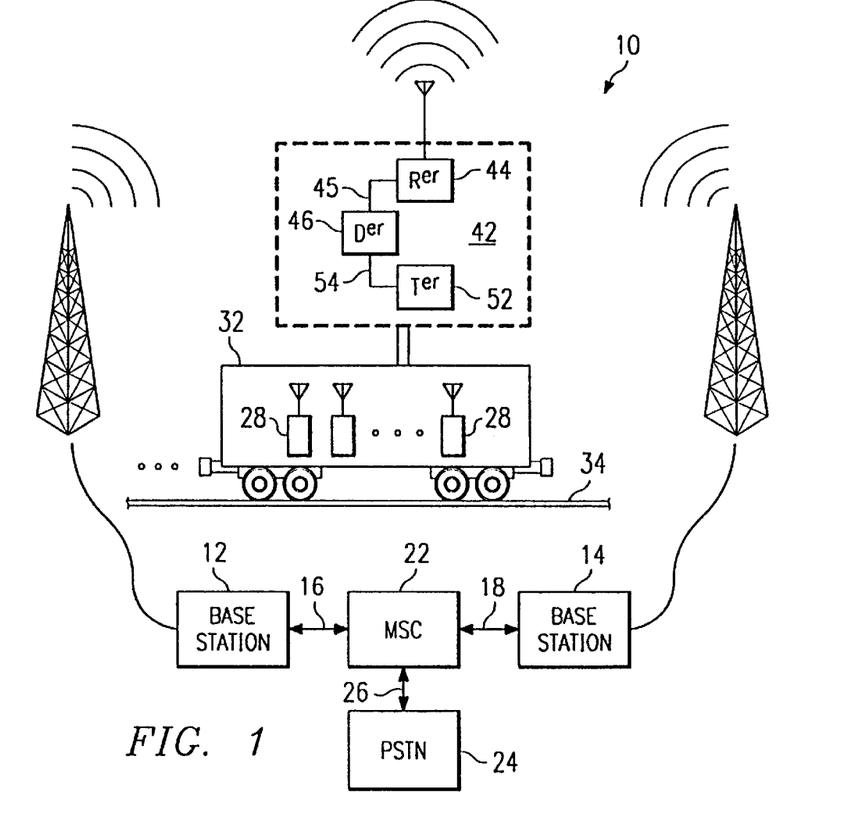
FIG. 1 is a partial schematic, partial functional block diagram of a communication system in which an embodiment of the present invention is operative.

Turning first to FIG. 1, a communication system, shown generally at 10, in which an embodiment of the present invention is operative, is illustrated. The communication system 10 is here shown to be a cellular communication system; other types of wireless communication systems can be similarly illustrated.

Two base stations 12 and 14 of the fixed network infrastructure of the cellular communication system are illustrated in the figure. Each of the base stations 12 and 14 define cells of the cellular communication system, in conventional manner. The base stations 12 and 14 each include transceiver circuitry operative to transmit and to receive radio frequency, communication signals. Only two base stations of the fixed network infrastructure of the cellular communication system are shown in the figure for purposes of simplicity. In an actual cellular communication system, of course, the fixed network infrastructure is typically formed of a large number of spaced-apart base stations, each defining one or more cells.

The base stations 12 and 14 are coupled, here shown by way of lines 16 and 18, respectively, to a mobile switching center 22. The mobile switching center 22 is operative, inter alia, to control operation of the base stations 12 and 14. The switching center 22 is further coupled to a public service telephonic network (PSTN) 24 by way of lines 26, in conventional fashion.

The communication system 10 is further shown to include a plurality of mobile subscriber units 28, each of which is positioned to be movable together with movement of a mass-transit device, here a train 32. The mobile subscriber units 28 may, for example, be carried by users thereof onto the train 32 to permit the users of the subscriber units to communicate via the cellular communication system as the train 32 travels along a route defined by the tracks 34 upon which the train is positioned.

As the train 32 travels along the tracks 34, the mobile subscriber units 28 pass between cells defined by the base stations 12 and 14. As the subscriber units 28 are all positioned to travel together with travel of the train 32, all of the subscriber units 28 travel in the same direction, at the same speed, during the same time period.

As mentioned previously, because of such common movement, the subscriber units, although acting independently, generate hand-off requests at substantially the same times. Because of the commonality of positioning of the subscriber units 28 at the train 32, the transceiver units 28 typically all communicate with the same base station, such as base station 12, of the fixed network infrastructure when the train 32 at which the subscriber units are positioned is located within the cell defined by such base station.

As the train 32 travels along the tracks 34 such that the train 32 travels beyond the cell defined by the base station 12 and into the cell defined by the base station 14, all of the transceiver units 28 are transported out of the cell defined by the base station 12 and into the cell defined by the base station 14.

In conventional operation, each subscriber unit 28 independently determines that communications between such subscriber unit and the fixed network infrastructure of the cellular system should be handed-off from the base station 12 to the base station 14. Hand-off requests are generated by each of the subscriber units 28 substantially concurrently due to the commonality of positioning of such subscriber units. When the fixed network infrastructure of the cellular system receives a large number of hand-off requests at substantially the same time, overloading of the fixed network infrastructure can result. When overloaded, system misoperation might occur resulting in, for instance, inadvertent communication termination of some of the subscriber units.

Circuitry 42 of an embodiment of the present invention is positioned to travel together with travel of the train 32 at which the subscriber units 28 are positioned. The circuitry 42 generates a common hand-off request requesting communication hand-offs for all of the subscriber units 28 positioned at the train 32 to be carried therewith. As a common hand-off request effectuates hand-offs of all of the subscriber units 28; if the common hand-off request is generated and the hand-offs are effectuated in a timely manner, hand-off requests are not independently generated by each of the subscriber units. And overloading of the fixed network infrastructure of the cellular system does not occur.

The circuitry 42, in the embodiment illustrated in the figure, includes a receiver 44 for receiving control signals generated, for example, upon control channels defined in the cellular system. The receiver 44 is more sensitive than the receiver circuitry forming portions of the subscriber units 28. Because of such greater sensitivity, the control signals generated by the base stations are first detected by the receiver 44, and operations responsive thereto can be earlier responded to by the circuitry 42. If the hand-offs of the subscriber units 28 are effectuated responsive to the common hand-off request prior to operation of the receiver circuitry of the individual ones of the subscriber units, the individual subscriber units shall not separately generate hand-off requests.

The receiver 44 of the circuitry 42 is coupled to a determiner 46 which also forms a portion of the circuitry 42. The determiner 46 is operative responsive to the signals received by the receiver 44 to determine whether a common hand-off request should be generated. The determiner is coupled to the receiver 44 by way of lines 48 to receive indications of the signals received by the receiver 44.

When the determiner 46 determines that a hand-off from one base station to another base station of the fixed network infrastructure should be effectuated, the determiner causes a transmitter 52, which also forms a portion of the circuitry 42, to transmit a common hand-off request to be transmitted to the fixed network infrastructure of the cellular system. The transmitter 52 is coupled to the determiner 46 by way of lines 54 to receive indications of times determined by the determiner in which a hand-off should be requested.

The common hand-off request generated by the transmitter 52 and received at the fixed network infrastructure is applied to the mobile switching center 22 thereof. Determinations are made at the mobile switching center 22 as to whether a hand-off should be effectuated responsive to the hand-off request.

The receiver 44 of the circuitry 42 is further operative to scan the communication channels, such as voice channels, upon which communication signals are transmitted between the subscriber units 28 and the fixed network infrastructure of the cellular system. Indications of the channels upon which ongoing communications between the subscriber units 28 and the fixed network infrastructure are also transmitted by the transmitter 52 of the circuitry 42 to the fixed network infrastructure. Such indications are also provided to the mobile switching center 22.

When a decision is made to hand-off communications from one base station to another base station of the fixed network infrastructure of the cellular system, the mobile switching center allocates the channels to which the subscriber units 28 are to be re-tuned, informs the selected base station of the hand-offs, and causes control signals to be transmitted to the individual ones of the subscriber units to cause re-tuning of the subscriber units to the newly-allocated channels.

The circuitry 42 is thereby operative to initiate effectuation of hand-offs of all of the subscriber units 28 positioned to travel together with travel of the train 32 by generating a common hand-off request. When the fixed network infrastructure of the cellular system detects the transmission of the common hand-off request, control signals are transmitted to the individual ones of the subscriber units 28 to re-tune the subscriber units, thereby to effectuate the hand-offs of the subscriber units. Because hand-off requests are not generated by each of the subscriber units 28, but, rather, a common, hand-off request is generated by the circuitry 42, overloading all the fixed network infrastructure of the cellular system is unlikely to occur.

Figure 2:
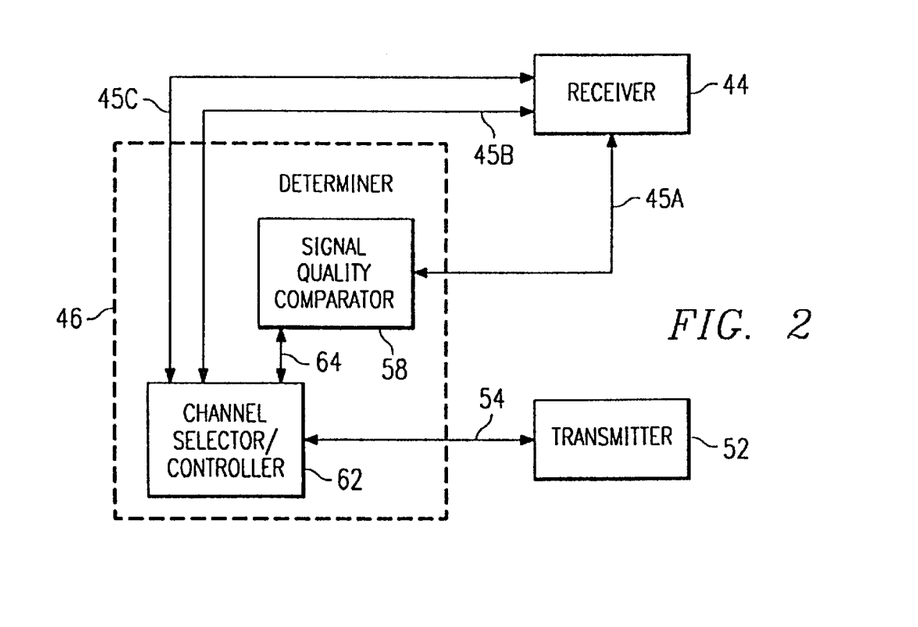
FIG. 2 is a functional diagram of the communication circuitry of an embodiment of the present invention.

The circuitry 42 is again illustrated in FIG. 2. The circuitry 42 is again shown to include a receiver 44, a determiner 46, and a transmitter 52. In the illustration of FIG. 2, the determiner 46 is shown to include a signal quality comparator 58 coupled by way of a line 45A to the receiver 44. The signal quality comparator 58 is operative to compare the signal qualities of control signals transmitted by the base stations of the fixed network infrastructure. In one embodiment, the signal strengths are compared by the comparator; in another embodiment, bit error rates of the received signals are compared by the comparator.

The receiver 44 is also coupled to a channel selector/controller 62 by way of a line 45B. The channel selector/controller 62 selects the channels upon which the receiver 44 is tuned. By appropriate selection of the channels to which the receiver 44 is tuned, the signals applied to the signal quality comparator 58 by way of line 45A permit the signal quality comparator to compare signals generated by selected base stations on selected control channels.

Results of the comparisons compared by the comparator 58 are applied by way of line 64 to the channel selector/controller. The channel selector/controller determines whether to permit the generation of a common hand-off request responsive to the values of the signals generated by the signal quality comparator. If a common hand-off request is to be generated, the selector/controller generates signals on the line 54 to cause the transmitter 52 to transmit the common hand-off request back to the fixed network infrastructure.

The selector/controller 62 is further operative to tune the receiver 44 to channels upon which communication signals can be transmitted between the subscriber units, such as the subscriber units 28 shown in FIG. 1, and the fixed network infrastructure of the cellular system. Indications of signals received by the receiver 44 when turned to such channels are provided to the selector/controller 62 by way of line 45C.

The selector/controller 62 is further operative responsive thereto to provide indications of which of the channels upon which communication signals are being transmitted, also on the line 54 to the transmitter 52. The transmitter 52 transmits signals representative of such indications back to the fixed network infrastructure.

While the circuitry 42 can be used in conjunction with almost any movable platform assembly at which subscriber units can be positioned, when the circuitry 42 is mounted at a train or other type of device which travels along a standard or set route, determinations as to which of the base stations that the ongoing communications should be handed-off is simplified.

Figure 3:
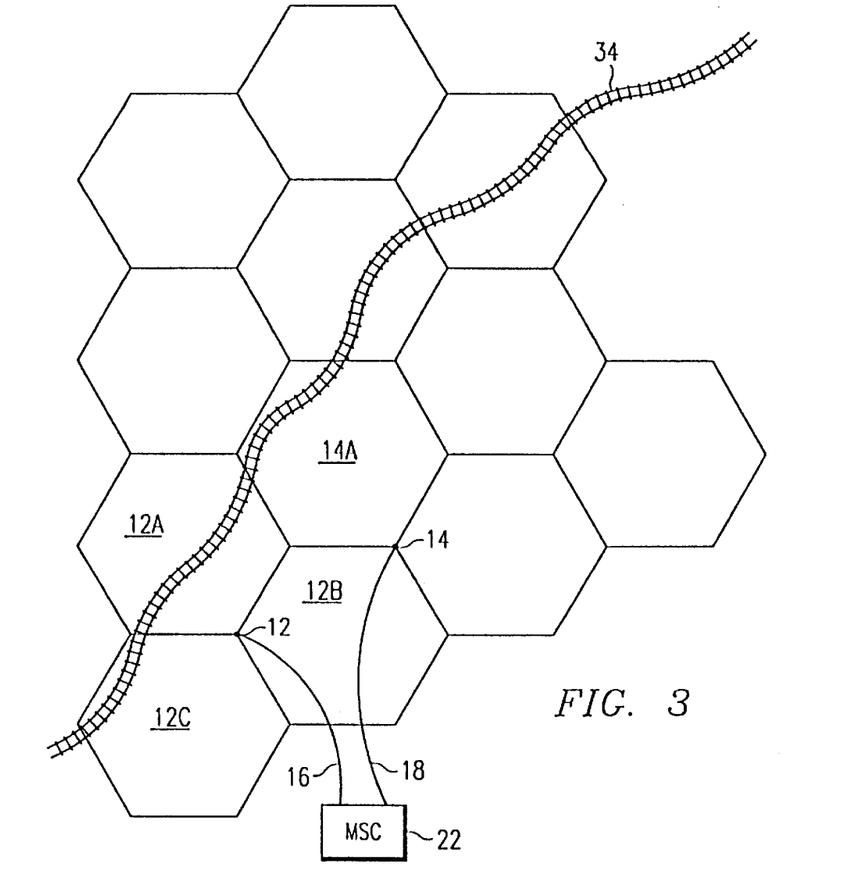
FIG. 3 is a representation of an exemplary cell structure of a cellular communication system and a transportation path which extends through the geographic area defined by the cells of the cellular system.

FIG. 3 illustrates a plurality of the cells defined by the communication system 10, shown in FIG. 1. Cells defined by the base stations 12 and 14, designated by 12A, 12B, 12C, 14A, 14B, and 14C, respectively, are indicated in the figure. And, the tracks 34 upon which the train 32 travels is also indicated in the figure.

Because the tracks 34 define a standard route of travel of the train 32 from which the train does not deviate, once the position and direction of travel of the train 32 is determined, when a hand-off request is generated by the circuitry 42 positioned to travel together with the train, the base station to which ongoing communications should be handed-off is predeterminable.

That is to say, the mobile switching center 22, or other control circuitry of the fixed network infrastructure, need not determine the base station to which the ongoing communications should be handed-off. Rather, a memory storage device at the mobile switching center 22 can store data indicative of to which of the base stations a hand-off should be effectuated. Channel allocation to the selected base station to permit ongoing communications are supplied to the selected base station and to the subscriber units in which ongoing communications are to be handed-off.

Figure 4:
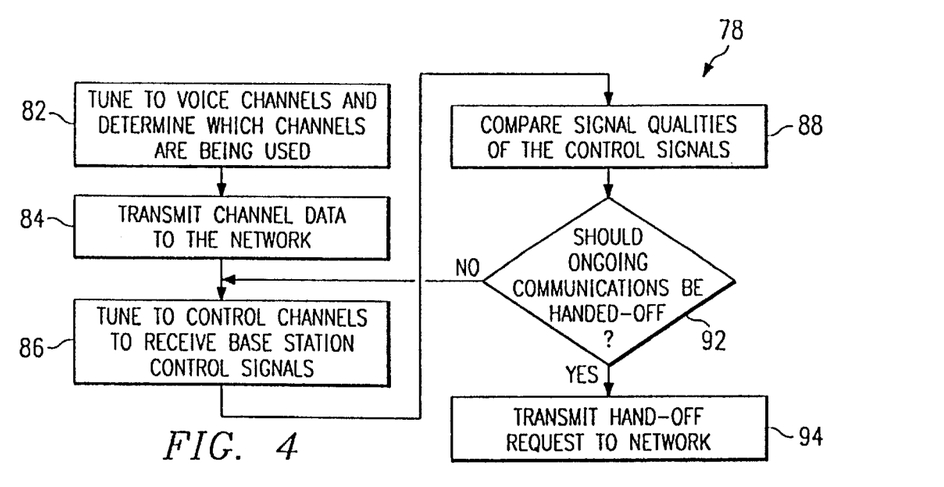
FIG. 4 is a logical flow diagram illustrating the method of operation of the circuitry shown in FIG. 2 according to an embodiment of the present invention.

FIG. 4 illustrates a method, shown generally at 78 which illustrates the method of operation of the circuitry 42, shown in FIGS. 1 and 2, of an embodiment of the present invention. The circuitry 42 is operative to generate signals representative of the communications channels utilized by the subscriber units 28 (shown in FIG. 1) in on-going communications with the fixed network infrastructure and to transmit common hand-off requests to the fixed network infrastructure.

First, and as a indicated by the block 82, the receiver of the circuitry is tuned to the communication channels upon which communications between the subscriber units and the fixed network infrastructure might be generated. Determinations are made as to which of the channels are being utilized by the subscriber units in on-going communications.

Then, and as indicated by the block 84, data indicative of which of the communication channels are being used by the various subscriber units are transmitted to the fixed network infrastructure. The data is transmitted to the fixed network infrastructure of the cellular system by the transmitter of the circuitry 42.

Next, and as indicated by the block 86, the receiver of the circuitry 42 is tuned to control channels to receive base station control signals generated by selected base stations of the cellular system. Signal qualities of the received signals are compared, as indicated by the block 88.

Responsive to the comparisons, a determination is made, as indicated by the decision block 92, as to whether on-going communications should be handed-off. If not, the no branch is taken back to block 86 and the control signals are continued to be monitored. If, however, a determination is made that on-going communications should be handed-off, the yes branch is taken to block 94, and the transmitter of the circuitry 42 transmits a hand-off request to the fixed network infrastructure requesting that all of the subscriber units be handed-off to another base station.

Figure 5:
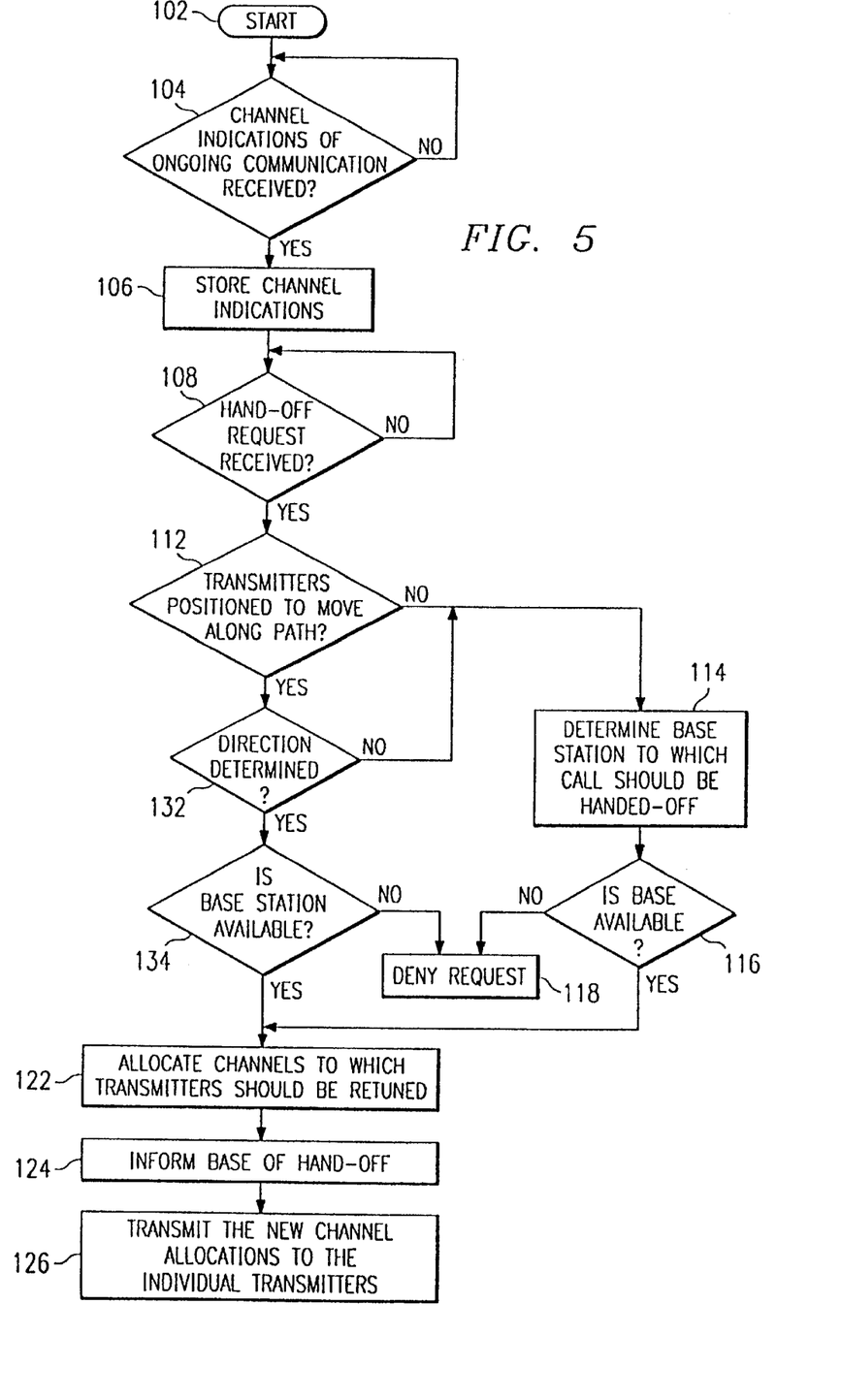
FIG. 5 is a logical flow diagram which illustrates the method of operation of network control circuitry during operation of an embodiment of the present invention.

FIG. 5 illustrates a method, shown generally at 98, representative of exemplary operation of circuitry of a mobile switching center, such as the mobile switching center 22 shown in preceding figures, or other control circuitry of a cellular communication system responsive to signals transmitted to the network by the circuitry 42.

First, and after entry, as indicated by the start block 102, a determination is first made as to whether the channel indications of on-going communication have been received at the fixed network infrastructure. If not, the branch is taken and monitoring for reception of such indications continues. If, conversely, such indications are received at the cellular system infrastructure, the yes branch is taken from a block 104 to block 106 and such data is stored by the mobile switching center.

Thereafter, and as indicated by the decision block 108, a determination is made as to whether a hand-off request generated by the circuitry 42 has been received. If not, the no branch is taken and monitoring continues. If, conversely, a request for common hand-off of all the subscriber units is received, the yes branch is taken to the decision block 112 and a determination is made as to whether the subscriber units are positioned to move along a standard, or other set, path.

If not, the no branch is taken to the block 114 whereat a determination is made as to which base station to which on-going communication should be handed-off. Thereafter, a determination is made, as indicated by the decision block 116 as to whether the selected base station is available. If not, the no branch is taken to block 118 and the request for a hand-off is denied. If the base station is available, the yes branch is taken to the block 122, and channels to which the subscriber unit should be re-tuned to effectuate a hand-off are allocated.

Then, as indicated by the block 124, the selected base station is informed of the channel allocation, and the channel allocations are transmitted to the individual subscriber units, as indicated by the block 126.

If the determination made at the decision block 112 indicates that the subscriber units are positioned to move along a standard path, the yes branch is taken to the decision block 132 whereat a determination is made as to whether the direction of movement of the subscriber unit along the standard path has been determined. If not, the no branch is taken to the block 114; otherwise, the yes branch is taken to the decision block 134 whereat a determination is made as to whether the predetermined base station stored at the mobile switching center is available. If not, the no branch is taken from the decision block 134 and the request for a hand-off is denied. If however, the predetermined base station is available, the yes branch is taken to the blocks 122, 124, and 126, as described above. In such manner, a hand-off request generated at the circuitry 42 can be effectuated for all of the subscriber units positioned to travel together with the circuitry 42.

A hand-off request common to all the subscriber units positioned to travel together with the circuitry 42 initiates effectuation of hand-offs of all of the subscriber units. Hand-off requests need not be generated by individual ones of the subscriber units to effectuate hand-offs. Because the common hand-off request is generated, loading problems which might otherwise occur if the subscriber units concurrently make independent hand-off requests are avoided. Inadvertent call termination or disruption resulting from overloading of infrastructure of the cellular system is less likely to occur and users of the cellular communications system are able to communicate by way of the cellular system while positioned to travel together on, for example, a mass transit device.

The previous descriptions are of preferred examples for implementing the invention, and the scope of the invention should not necessarily be limited to buy this description. The scope of the present invention is defined by the following claims.

What is claimed is:

1. Communication circuitry for controlling communications between a group of mobile transceiver units and a wireless communication network infrastructure having at least a first fixed-site transceiver unit and a second fixed-site transceiver unit, each of the mobile transceiver units positioned to move together at substantially similar velocities during substantially similar time periods, said communication circuitry comprising:

a receiver positioned to move together with the group of mobile transceiver units, said receiver tunable to receive infrastructure-generated control signals transmitted by the at least first and second fixed-site transceiver units, respectively;

a determiner coupled to receive indications of the infrastructure-generated control signals received by said receiver, said determiner for determining between which of the at least first and second fixed-site transceiver units communications with the group of mobile transceiver units are best able to be effectuated and for generating fixed-site allocation request signals responsive thereto; and a transmitter positioned to move together with the group of mobile transceiver units and coupled to receive the fixed-site allocation request signals generated by said determiner, said transmitter for transmitting the fixed-site allocation request signals to the wireless communication network infrastructure requesting allocation of a particular one of the at least first and second fixed-site transceivers through which to effectuate the communications between the group of mobile transceiver units and the wireless communication network infrastructure.

2. The communication circuitry of claim 1 wherein said determiner is positioned to move together with the group of mobile transceiver units.

3. The communication circuitry of claim 1 wherein the mobile transceiver units comprise cellular subscriber units, wherein the at least first and second fixed-site transceiver units comprise fixed-site base stations of a cellular network infrastructure, and wherein said receiver, said determiner, and said transmitter together form a mobile base station positioned to move together with movement of the group of cellular subscriber units.

4. The communication circuitry of claim 3 wherein the cellular subscriber units are positioned at a movable platform assembly to move together therewith, and wherein said mobile base station is positioned at the movable platform assembly, also to move together therewith.

5. The communication circuitry of claim 1 wherein the infrastructure-generated control signals generated by the at least first and second fixed-site transceivers are transmitted upon control channels and wherein said receiver is selectively tunable to the control channels.

6. The communication circuitry of claim 1 further comprising a signal strength comparator coupled to said receiver, said signal strength comparator for comparing signal levels of the control signals received by said receiver.

7. The communication circuitry of claim 6 wherein said signal strength comparator further generates signal strength level comparison signals representative of the signal levels of the infrastructure-generated control signals and wherein the indications of the control signals, to which said determiner is coupled to receive, comprise the signal strength level comparison signals.

8. The communication circuitry of claim 7 wherein determinations made by said determiner are made responsive to the signal strength level comparison signals.

9. The communication circuitry of claim 1 wherein said receiver further receives indications of which of the selected transmission channels are being used by the group of mobile transceiver units in ongoing communications to communicate with the infrastructure via the first fixed-site transceiver unit, wherein the fixed-site allocation request signals comprise hand-off requests requesting the infrastructure to hand-off the ongoing communications via the first fixed-site transceiver to the second fixed-site transceiver, and wherein said transmitter transmits the hand-off requests to the infrastructure.

10. The communication circuitry of claim 9 wherein said transmitter is further coupled to receive signals representative of the indications received by said receiver of which of the selected transmission channels are being used by the group of mobile transceiver units, and wherein said transmitter further transmits the signals representative of the indications to the infrastructure.

11. The communication circuitry of claim 10 wherein the wireless communication network infrastructure further comprises control circuitry, said control circuitry coupled to receive at least the hand-off requests transmitted by said transmitter.

12. The communication circuitry of claim 11 wherein said control circuitry selects to which of the at least first and second fixed-site transceivers the ongoing communications are to be handed off responsive to reception of the hand-off requests.

13. The communication circuitry of claim 11 wherein said control circuitry assigns transmission channels of the set of transmission channels which are to be used to communicate the ongoing communications of the mobile transceiver units to effectuate the hand-off effectuated by the hand-off requests.

14. The communication circuitry of claim 13 wherein at least one of the first and second fixed-site transceivers of the infrastructure transmit indications of the transmission channels assigned by the control circuitry to the group of mobile transceiver units.

15. The communication circuitry of claim 1 wherein the communication network infrastructure further comprises control circuitry for allocating channels upon which communications between the group of mobile transceiver units and an allocated one of the at least first and second fixed-site transceivers occur such that, when a mobile transceiver unit of the group requests admission to communicate pursuant to the wireless communication system, the control circuitry assigns the mobile transceiver unit to communicate upon at least a selected one of the channels allocated by the control circuitry.

16. In a wireless communication system having a communication network infrastructure having at least a first fixed-site transceiver unit and a second fixed-site transceiver unit, an improvement of circuitry for controlling communications between a group of mobile transceiver units and the communication network infrastructure, each of the mobile transceiver units positioned to move together at substantially similar velocities during substantially similar time periods, said communication circuitry comprising:

a receiver positioned to move together with the group of mobile transceiver units, said receiver tunable to receive infrastructure-generated control signals transmitted by the at least first and second fixed-site transceiver units, respectively;

a determiner coupled to receive indications of the infrastructure-generated control signals received by said receiver, said determiner for determining between which of the at least first and second fixed-site transceiver units communications with the group of mobile transceiver units are best able to be effectuated and for generating fixed-site allocation request signals responsive thereto;

a transmitter positioned to move together with the group of mobile transceiver units and coupled to receive the fixed-site allocation request signals generated by said determiner, said transmitter for transmitting the fixed-site allocation request signals to the wireless communication network infrastructure requesting allocation of a particular one of the at least first and second fixed-site transceivers through which to effectuate the communications between the group of mobile transceiver units and the wireless communication network infrastructure; and control circuitry coupled to receive signals representative of the fixed-site allocation request signals transmitted by said transmitter, said control circuitry for controlling the allocation the particular one of the at least first and second fixed-site transceivers responsive to the fixed-site allocation request signals.

17. A method for controlling communications between a group of mobile transceiver units and a wireless communication network infrastructure having at least a first fixed-site transceiver unit and a second fixed-site transceiver unit, each of the mobile transceiver units positioned to move together at substantially similar velocities during substantially similar time periods, said method comprising the steps of:

tuning a receiver positioned to move together with the group of mobile transceiver units to receive infrastructure-generated control signals transmitted by the at least first and second fixed-site transceiver units, respectively;

determining, responsive to the infrastructure-generated control signals received during said step of tuning, between which of the at least first and second fixed-site transceiver units communications with the group of transceiver units are best able to be effectuated;

generating fixed-site allocation request signals responsive to determinations determined during said step of determining; and transmitting, with a transmitter positioned to move together with the group of mobile transceiver units and coupled to receive the fixed-site allocation request signals generated by a determiner, the fixed-site allocation request signals to the wireless communication network infrastructure to request allocation of a particular one of the at least first and second fixed-site transceivers through which to effectuate the communications between the group of mobile transceiver units and the wireless communication network infrastructure.

* * * * *

UNITED STATES PATENT AND TRADEMARK OFFICE
CERTIFICATE OF CORRECTION

PATENT NO. : 5,924,033
DATED : July 13, 1999
INVENTOR(S) : Carlsson et al.

Page 1 of 1

It is certified that error appears in the above-identified patent and that said Letters Patent is hereby corrected as shown below:

Column 10,
Line 51, after "indications of" delete -- which of the selected --
Line 52, after "channels" insert -- that --
Line 63, after "said receiver" delete -- of which --
Line 64, before "transmission" delete -- selected --
Line 64, after "channels" insert -- that --

Column 11,
Lines 11-12, after "assigns transmission channels" delete -- of the set of transmission channels --

Signed and Sealed this

Twenty-fifth Day of September, 2001

Attest:

NICHOLAS P. GODICI
Attesting Officer
Acting Director of the United States Patent and Trademark Office